United States Patent [19]
Sundelin et al.

[11] Patent Number: 6,144,861
[45] Date of Patent: Nov. 7, 2000

[54] DOWNLINK POWER CONTROL IN A CELLULAR MOBILE RADIO COMMUNICATIONS SYSTEM

[75] Inventors: Magnus Sundelin, Stocksund; Jens Knutsson, Danderyd; Paul Peter Butovitsch, Bromma, all of Sweden; Carl M. Thornberg, Tokyo, Japan

[73] Assignee: Telefonaktiebolaget LM Ericsson, Stockholm, Sweden

[21] Appl. No.: 09/055,781

[22] Filed: Apr. 7, 1998

[51] Int. Cl.[7] ..................................................... H04B 7/00
[52] U.S. Cl. .............................. 455/522; 455/69; 455/442
[58] Field of Search .............................. 455/442, 69, 522, 455/436, 437, 226.2, 226.3, 63, 67.3; 370/331, 332

[56] References Cited

U.S. PATENT DOCUMENTS

| | | | |
|---|---|---|---|
| 4,613,990 | 9/1986 | Halpern | 455/522 |
| 5,257,283 | 10/1993 | Gihousen et al. | 455/69 |
| 5,590,409 | 12/1996 | Sawahashi et al. | 455/522 |
| 5,715,526 | 2/1998 | Weaver, Jr. et al. | |
| 5,839,056 | 11/1998 | Hakkinen | 455/522 |
| 5,878,350 | 3/1999 | Nakamura et al. | 455/522 |
| 5,881,368 | 3/1999 | Grob et al. | 455/69 |

FOREIGN PATENT DOCUMENTS

| | | |
|---|---|---|
| 0 680 160 | 11/1995 | European Pat. Off. . |
| 0 809 365 | 11/1997 | European Pat. Off. . |

OTHER PUBLICATIONS

Institute of Electrical and Electronics Engineers,—Gateway to the Future Technology in Motion, St. Louis, MO, Conf. 41, May 19, 1991, pp. 57–62, XP000260154, A. Salamasi et al., "On the System Design Aspects of Code Division Multiple Access (CDMA) Applied to Digital Cellular and Personal Communications Networks".

A. Salmasi et al.: "On the System Design Aspects of Code Division Multiple Access (CDMA) Applied to Digital Cellular and Personal Communications Networks," Gateway to the Future—Technology in Motion, St. Louis, May 19–22, 1991, No. Conf. 41, May 19, 1991, pp. 57–62, XP000260154, Institute of Electrical and Electronics Engineers.

Power Control under Soft Handover, FPLMTS Study Committee, Air–interface WG, SWG2, Document No. AIF/SWG2-16-18 (P), Matsushita Communication Industrial Co., Ltd., Mar. 30, 1998.

Power Control under Soft Handover, FPLMTS Study Committee, Air–interface WG, SWG2, Document No. AIF/SWG2-15-2 (C), Matsushita Communication Industrial Co., Ltd., Mar. 11, 1998.

TIA/EIA Interim Standard Mobile Station–Base Station Compatibility Standard for Dual–Mode Wideband Spread Spectrum Cellular System, TIA/EIA/IS–95, Jul. 1993.

*Primary Examiner*—William G. Trost
*Assistant Examiner*—Quochien B. Vuong
*Attorney, Agent, or Firm*—Nixon & Vanderhye P.C.

[57] ABSTRACT

The transmit power of a base station transmission to a mobile station is advantageously controlled. The base station receives a signal from the mobile station and determines a signal-to-interference ratio (SIR) associated with the received signal. The base station controls its transmit power to the mobile station using the determined SIR value in conjunction with a transmit power control command received from the mobile station. When the mobile station is in the process of a soft handover involving two or more base stations, each of those base stations determines an SIR value associated with a signal received from the mobile station. Moreover, each of the base stations controls its respective power using both the power control command received from the mobile station and the SIR determined by that base station. Similarly, when the mobile station is in the process of softer handover involving two or more sectors of a single base station, the SIR associated with a signal received from the mobile station in each of those base station sectors is determined and used to control the respective power of each base station sector in conjunction with a power control command received from the mobile station.

36 Claims, 6 Drawing Sheets

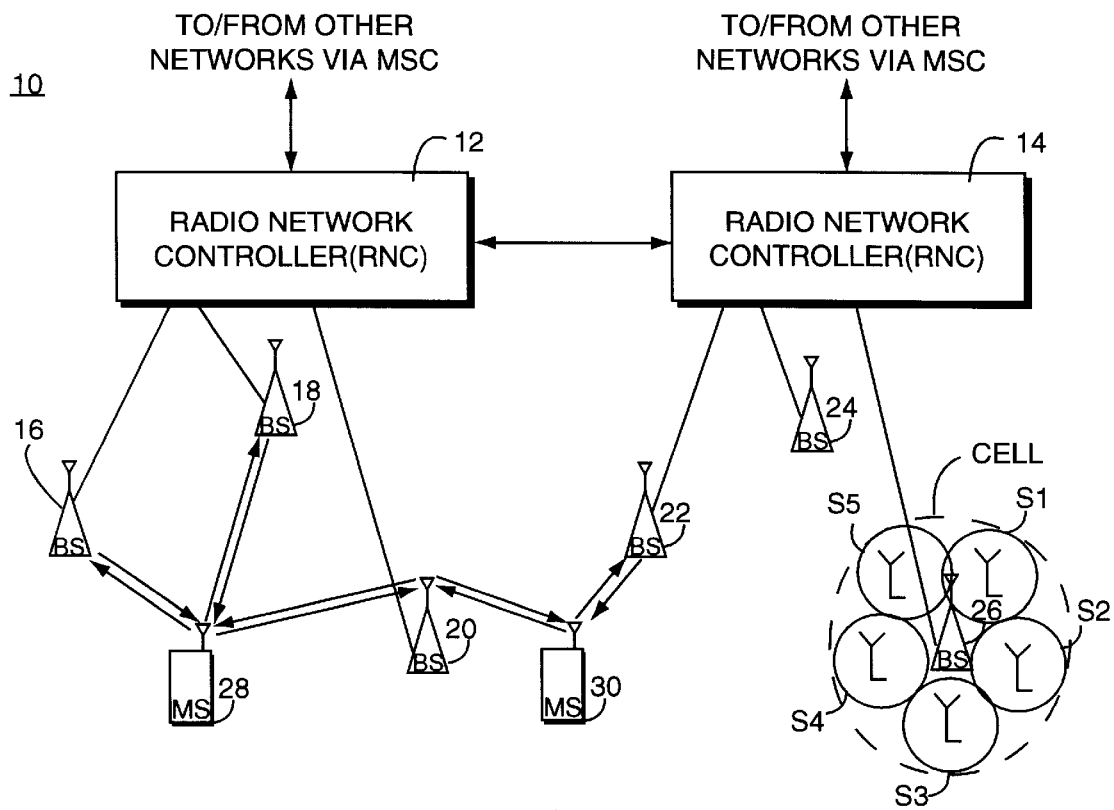
FIG. 1
FIG. 2
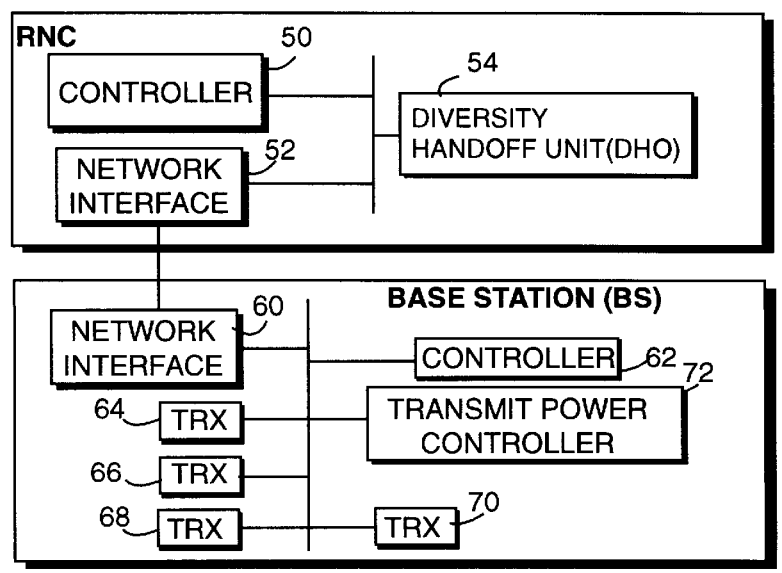

DOWNLINK POWER CONTROL IN A CELLULAR MOBILE RADIO COMMUNICATIONS SYSTEM

FIELD OF THE INVENTION

The present invention relates to cellular telephone systems. More specifically, the present invention relates radio transmission power control during handover situations in a code division multiple access cellular telephone system.

BACKGROUND AND SUMMARY OF THE INVENTION

In a cellular communications system, a mobile radio station communicates over an assigned radio channel with a radio base station. Several base stations are connected to a switching node which is typically connected to a gateway that interfaces the cellular communications system with other communication systems. A call placed from an external network to a mobile station is directed to the gateway, and from the gateway through one or more switching nodes to a base station which serves the called mobile station. The base station pages the called mobile station and established a radio communications channel. A call originated by the mobile station follows a similar path in the opposite direction.

In a Code Division Multiple Access (CDMA) mobile communication system, the information transmitted between a base station and a mobile station is modulated using a spreading code. Spreading codes are used to distinguish information associated with different mobile stations or base stations transmitting over the same radio frequency band. In other words, individual radio "channels" correspond to and are discriminated on the basis of these codes. Various aspects of CDMA are set forth in one or more textbooks such as *Applications of CDMA and Wireless/Personal Communications*, Garg, Vijay K. et al., Prentice-Hall 1997.

Spread spectrum communications permit mobile transmissions to be received at two or more ("diverse") base stations and processed simultaneously to generate one received signal. With these combined signal processing capabilities, it is possible to perform a handover from one base station to another, (or from one antenna sector to another antenna sector connected to the same base station), without any perceptible disturbance in the voice or data communications. This kind of handover is typically called diversity handover.

During diversity handover, the signaling and voice information from plural sources is combined in a common point with decisions made on the "quality" of the received data. In soft handover, as a mobile station involved in a call moves to the edge of a base station's cell, the adjacent cell's base station assigns a transceiver to the same call while a transceiver in the current base station continues to handle that call as well. As a result, the call is handed over on a make-before-break basis. Soft diversity handover is therefore a process where two or more base stations handle the call simultaneously until the mobile station moves sufficiently close to one of the base stations which then exclusively handles the call. "Softer" diversity handover occurs when the mobile station is in handover between two different antenna sectors connected to the same, multisectored base station using a similar make-before-break methodology.

Because all users of a CDMA communications system transmit information using the same frequency band at the same time, each user's communication interferes with the communications of the other users. In addition, signals received by a base station from a mobile station close to the base station are much stronger than signals received from other mobile stations located at the base station's cell boundary. As a result, distant mobile communications are overshadowed and dominated by closein mobile stations which is why this condition is sometimes referred as the "near-far effect."

Therefore, to achieve increased capacity by decreasing unnecessary interference, all mobile-transmitted signals should arrive at the base station with about the same average power irrespective of their distance from the base station. Transmit power control (TPC) is therefore a significant factor in improving the performance and capacity of a CDMA system. In general, the mobile station attempts to control its transmit power based on the power control messages sent to the mobile station from the base station with the end goal of controlling power received at the base station within a relatively small tolerance, e.g., 1 dB for all mobile station transmissions received at that base station.

The above power control operations relate to uplink (or reverse) power control for transmissions from the mobile station to the base station. Downlink (or forward) transmit power control is also important for transmission from a transceiver in the base station to the mobile station. In downlink power control, the base station varies the power of the transceiver transmitting to the mobile station depending on downlink transmit power control messages or commands sent by the mobile station.

Because power control in CDMA systems is very important, transmit power control adjustments occur very frequently, e.g., every 0.625 milliseconds. During downlink transmit power regulation, the mobile station is continually measuring the transmit power level received from the base station and determining whether the measured value is higher than a reference value. If so, a transmit power control bit having one value is sent uplink from the mobile station instructing the base station to decrease its transmit power to the mobile station by a predetermined increment, e.g., 1 dB, down to a minimum transmit power value. On the other hand, when the measured value is lower than the reference value, the transmit power control bit with the opposite value is transmit uplink to the base station for it to increase its transmit power by a predetermined increment, e.g., 1 dB, up to a maximum value. Downlink transmit power control begins while uplink and downlink synchronization are being acquired and continues throughout the mobile communication.

There are several problems with downlink transmit power among base stations or among base station sectors involved in diversity handover. Consider the example where a mobile station is traveling away from base station A toward base station B and is entering into a handover situation. Both base stations A and B receive the same downlink transmit power control command from the mobile station, and therefore, both base stations A and B transmit at a relatively high level to the mobile station for the duration of the handover operation irrespective of when or whether the mobile station receives one of the base station transmissions much more strongly (hereafter the "dominant" base station). In other words, it is usually unnecessary and counterproductive to have a less dominant base station transmit at high power levels to the mobile station until the mobile moves closer and/or the less dominant base station becomes more dominant. In effect, that high power level is wasted because the mobile is still essentially under the control of the dominant base station. Moreover, that high power level adversely interferes with other mobile communications.

To solve these problems, open loop power control is employed in the downlink power control during soft or softer handover. The open loop power control works in conjunction with closed loop power control and reduces the transmit power from the less dominant base stations or base station sectors involved in the soft or softer handover, e.g., those receiving signals from the mobile signal with lowest signal-to-interference ratio (SIR), thereby reducing interference to the system. The open loop control method in accordance with the present invention effectively and accurately controls the transmit powers from the base stations or sectors involved in the diversity handover so that only the dominant base station or sector is transmitting to the mobile station at a relatively high power. The transmit power levels of less dominant base stations or sectors are maintained at lower power levels to reduce interference. In addition, the handing over, dominant base station or sector decreases its transmit power to the mobile relatively quickly as soon as a less dominant base station or sector becomes the dominant base station or sector in the handover operation.

Accordingly, the present invention provides a method for controlling the transmit power of a base station transmission to a mobile station. The base station receives a signal from the mobile station and determines a signal-to-interference ratio (SIR) associated with the received signal. The base station controls its transmit power to the mobile station using the determined SIR value in conjunction with a transmit power control command received from the mobile station. When the mobile station is in the process of a soft handover involving two or more base stations, each of those base stations determines an SIR value associated with a signal received from the mobile station. Moreover, each of the base stations controls its respective power using both the power control command received from the mobile station and the SIR determined for that base station. Similarly, when the mobile station is in the process of softer handover involving two or more sectors of a single base station, the SIR associated with a signal received from the mobile station in each of those base station sectors is determined and used along with a power control command from the mobile station to control the respective power of each base station sector in conjunction with a power control command received from the mobile station.

In soft handover and softer handover applications of the invention, the mobile station signal is initially received at a first, dominant base station/sector with an SIR greater than the SIR of the mobile signal received at a second, less dominant base station/sector. As the mobile station moves into a soft/softer handover region between the first and second base stations/sectors, the SIR of the mobile signals received at the second base station/sector increases, and as a result, the transmit power to the mobile station at the second base station/sector increases. At the same time, the SIR of the mobile signals received at the first base station decreases, and accordingly, the transmit power to the mobile station from the first base station/sector decreases. The rate at which the transmit power for the first base station/sector decreases as well as the rate at which the transmit power from the first base station/sector increases may be selectively adjusted.

In a preferred embodiment, plural transmit power control commands from the mobile station are accumulated at each base station/sector (closed loop control), and the accumulated sum is combined with the determined SIR (open loop control). The SIR value may be preferably averaged or delayed and processed using a non-linear operation/function/scaling operation. The combined signal is used to optimally regulate the transmit power of the base station/sector to the mobile station.

BRIEF DESCRIPTION OF THE DRAWINGS

The foregoing and other objects, features, and advantages of the invention will be apparent from the following description of preferred embodiments as well as illustrated in the accompanying drawings in which reference characters refer to the same parts throughout the various views. The drawings are not necessarily to scale, emphasis instead being placed upon illustrating the principles of the invention.

FIG. 1 is a schematic overview of an example mobile cellular communications system where the present invention may be employed;

FIG. 2 is a function block diagram showing a more detailed radio network controller in a base station shown in FIG. 1;

DETAILED DESCRIPTION OF THE DRAWINGS

Figure 3:
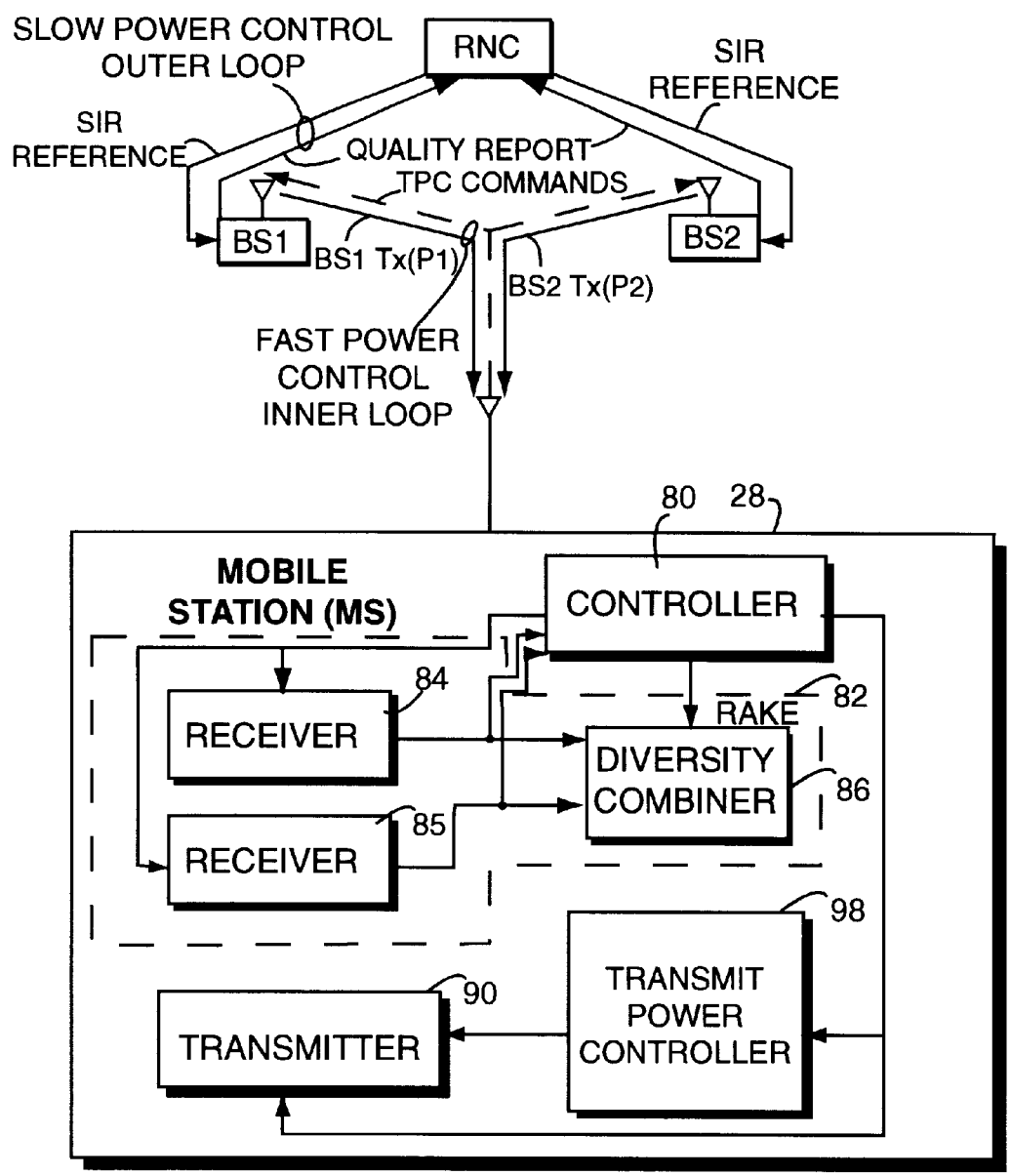
FIG. 3 is a function block diagram illustrating in more detail a mobile station shown in FIG. 1 as well as power control commands involving a mobile station, two base stations, and a radio network controller.

In the following description, for purposes of explanation and not limitation, specific details are set forth, such as particular embodiments, procedures, techniques, etc., in order to provide a thorough understanding of the present invention. However, it will be apparent to one skilled in the art that the present invention may be practiced in other embodiments that depart from these specific details. For example, while the present invention is sometimes described in the context of a soft handover operation, the present invention is equally applicable to softer handover situations. In other instances, detailed descriptions of well-known methods, interfaces, devices, and signaling techniques are omitted so as not to obscure the description of the present invention with unnecessary detail.

FIG. 1 illustrates a mobile radio cellular communications system 10 which, in accordance with the preferred embodiment of the present invention, is a CDMA or wideband-CDMA communications system. Radio network controllers (RNCs) 12 and 14 control various radio network functions including for example call switching, diversity handover, etc. Radio network controller 12 is coupled to a plurality of base stations 16, 18, and 20. Radio network controller 14 is connected to base stations 22, 24, and 26. Each base station serves a geographical area referred to as a cell, and a cell may be divided into plural sectors S1–S5 as shown for example for base station 26. Each sector includes one or more antennas. The base stations are connected to the corresponding radio network controller by various means such as dedicated telephone lines, optical fiber links, microwave links, etc. Both radio network controllers 12 and 14 are connected with external networks such as the Public Switched Telephone Network (PSTN), the Internet, etc. through one or more mobile switching centers (MSCs) (not shown). The RNC directs mobile station calls via the appropriate base station(s) and sectors.

In FIG. 1, two example mobile stations 28 and 30 are shown communicating with plural base stations. Mobile station 28 is communicating with base stations 16, 18, and 20, and mobile station 30 is communicating with base stations 20 and 22. Diversity communication to/from mobile station 30 via plural sectors is handled within the base station. A control link between radio network controllers 12 and 14 permits diversity communications to/from mobile station 30 via base stations 20 and 22. Each radio communication channel established between the mobile station and a base station has an uplink component and a downlink component. As described above, since multiple communications utilize the same radio frequencies in code division multiple access communication, spreading codes along with other well known CDMA techniques are used to distinguish between the various mobile station and base station communications. For purposes of describing the example embodiment, the term "channel" typically refers to a CDMA channel which is defined in terms of an RF frequency and a particular spreading code sequence.

Additional details of a base station and a radio network controller are now provided in conjunction with FIG. 2. Each radio network controller (RNC) includes a network interface 52 for interfacing communications with various base stations. Within the RNC, the network interface 52 is connected to a controller 50 and to a diversity handover unit (DHO) 54. Diversity handover unit 54 performs numerous functions required for establishing, maintaining, and dropping diversity connections.

Each base station includes a corresponding network interface 60 for interfacing with the RNC. In addition, the base station includes a controller 62 connected to a plurality of transceivers (TRX) 64, 64, 68, and 70, as well as a transmit power controller 72. Controller 62 controls the overall operation of the base station. Representative transceivers 64–70 are individually assigned to specific communications with mobile stations. At least one transceiver is employed as a common control channel over which the base station transmits common signaling such as a pilot signal or a PERCH signal. The common channel is monitored by mobile stations within or near that base station's cell, and is also used to request a working channel (uplink) or to page a mobile station (downlink). Transmit power controller 72 participates in downlink power control procedures.

As described above, one of the advantages of CDMA communications is diversity (including soft and softer) handover. Using soft handover as an example, as a mobile station moves to the edge of the current base station cell, the mobile detects the power level of the common channel signaling (e.g., the pilot or PERCH signal) and determines that there is sufficient signal strength from that common signal for that base station to be a target base station (BS2) for handover. The mobile station then sends a power measurement message to the serving base station (BS1) and sends a handover request message to the RNC. The RNC accepts the handover request and sends an inter-base station handover request message to the target base station. The target base station then assigns a transceiver to the call involving the mobile station while the serving base station continues to handle the call. The RNC combines the connections from the two base stations so that the handover is processed without a break, i.e., soft handover. This make-before-break handling of the call by two or more base stations occurs until the mobile station moves sufficiently close to one of the base stations or away from one of the base stations for the farther base station to be dropped.

Reference is made to FIG. 3 for a better understanding of the downlink power control procedures employed at soft handover in accordance with the present invention. Although multiple base stations may be involved in a diversity handover, and although more than one RNC may be involved in a diversity handover, such as illustrated in FIG. 1 with respect to communications between base station 20 and 22 and mobile station 30, the following description is simplified for purposes of illustration only to the scenario involving only two base stations BS1 and BS2 connected to the same RNC are involved in the diversity handover.

The mobile station includes a controller 80 connected to a RAKE receiver 82, a transmit power controller 88, and a transmitter 90. The mobile station's transmit power controller 88 uses uplink power control commands from the base stations BS1 and BS2 to adjust the mobile's uplink transmit power up or down by an appropriate increment in accordance with the received commands. The RAKE receiver 82 includes plural receivers 84 and 85 (there may be additional receivers as well) connected to a diversity combiner 86. The transmissions from the two base stations BS1 and BS2 are received as multipaths in the receivers 84 and 85, combined in a diversity combiner 86, and processed as one signal. Controller 80 determines signal-to-interference ratio (SIR) values of received signals. The mobile station's transmit power controller 88 compares the detected SIR with an SIR reference, and the difference is used to determine the value of TPC command sent uplink. Based upon the SIR measurement of the diversity-combined signal, the controller 80 generates transmit power control (TPC) commands (dashed lines) and transmits them via transmitter 90 to both the serving, currently dominant base station BS1 and the target, currently less dominant base station BS2. The TPC commands may include one or more bits which indicate a desired increase in transmit power, a desired decrease in transmit power, or no change in transmit power. Of course, any number of bits or bit assignments is possible.

Based on the received increase or decrease TPC commands, BS1 and BS2 increase or decrease their respective transmit powers by the corresponding increment, e.g., 0.5 or 1 dB. The adjustment of the transmit power from each base station (downlink) at the base station in response to uplink transmit power commands from the mobile station to each base station is referred to as a fast, downlink power, inner control loop. In addition, a slow, outer control loop may also be employed in both uplink and downlink power control where frame error rate or bit error rate is estimated and a target or reference SIR is updated accordingly. When the mobile station is in soft handover, the RNC is involved in the target SIR update.

Figure 4:
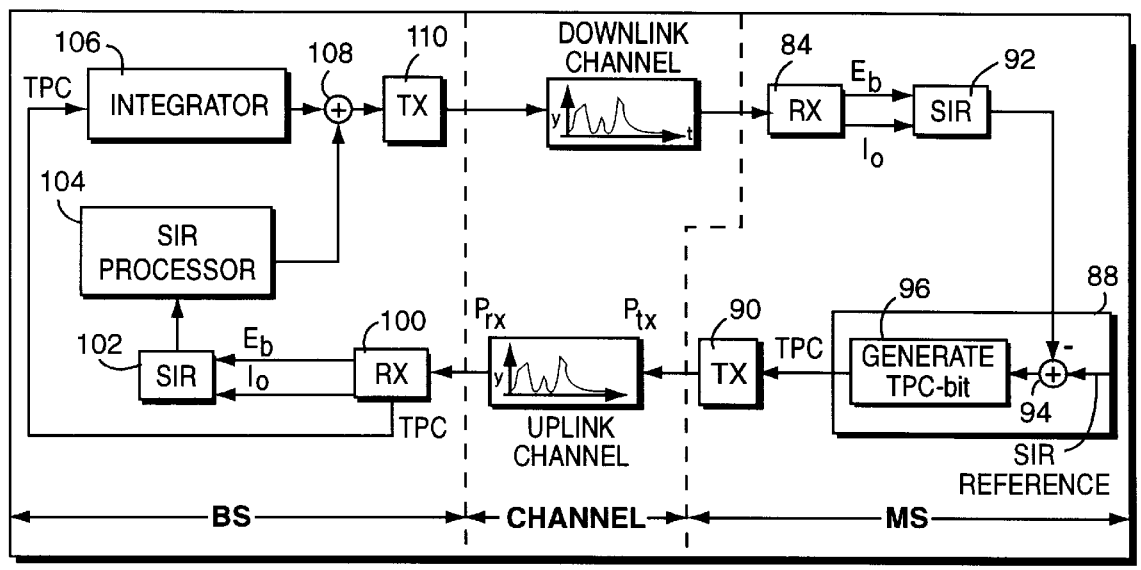
FIG. 4 is a diagram showing a downlink transmit power control loop in which an example embodiment of the present invention is implemented.

A first specific example embodiment of the present invention is now described in conjunction with the function block diagram shown in FIG. 4. The fast downlink, power control, closed loop in FIG. 4 includes an integrator 106, a base station transmitter 110, the downlink channel, the mobile station receiver (RX) 84, a signal-to-interference ratio (SIR) detector 92, a differencer 94, a transmit power control (TPC) bit generator 96, a mobile station transmitter (TX) 90, an uplink channel, and a base station receiver (RX) 100 connected to the integrator 106. In addition, the present invention employs an open loop, downlink power control which includes base station receiver (RX) 100, an SIR detector 102, an SIR processor 104, and a combiner 108. The open loop reduces the transmit power from the base station with the higher path loss to the mobile station during a soft handover as indicated by a lower SIR detected for signals received from the mobile station. Reduced base station transmit power beneficially reduces the overall interference level in the cellular communications system.

Signal-to-Interference Ratio is preferably employed as the open loop power control parameter. However, other signal quality measurements may be used like BER, CIR, etc. The use of signal-to-interference ratio is superior to simply using received power as the open loop power control parameter. First, signal-to-interference ratio values $E_b$ and $I_o$ are already available in the base station receiver since those parameters are generally required for uplink power control. Second, signal-to-interference ratio is also a better measure of signal quality than received power of signal strength. A signal may be received at a very high power level may nevertheless be of poor quality if there is considerable interference received as well. Conversely, a signal received at low power may nonetheless be perfectly acceptable if there is only minimal interference. Thus, received power or signal strength is not necessarily a relevant indicator as to which of the base stations involved in a soft handover is the dominant base station transmitting to the mobile station having the "best" connection with the mobile station. The result of this open loop, SIR-based control is that the transmit power level of less dominant base station(s) involved in the handover is regulated to a relatively low level while the transmit level of the dominant base station is maintained at a relatively high level. When the mobile station moves sufficiently close to one of the less dominant base stations to make it the new dominant base station, the new dominant base station's transmit power is increased while the old dominant base station's transmit power is decreased.

The signal transmitted by base station transmitter 110 via the downlink channel to the mobile station is received in mobile station receiver 84 which measures the signal energy ($E_b$) and interference ($I_o$) levels associated with the received signal and generates a signal-to-noise ratio (SIR) in SIR unit 92. A difference is determined between an SIR reference value and the detected SIR value in SIR unit 92 and differencer 94. The transmit power controller 88 then generates a TPC bit (increase power, decrease power, no change) which is transmitted by mobile station transmitter 90 over the uplink channel to the base station receiver 100. Base station receiver 100 demodulates the TPC bit from the mobile station and provides it to integrator 106 which produces an accumulated sum of received TPC bits output to a summer 108.

Base station receiver 100 also generates signal energy $E_b$ and interference $I_o$ values corresponding to a signal received from the mobile station. An SIR unit 102 divides the $E_b$ value by the $I_o$ value and provides the SIR value for processing at an optimal SIR processor 104 and combination with the integrated TPC value in summer 108. The summer 108 output is a scaled transmit power control signal used to control the output power of the transmitter 110 in the base station.

Figure 5:
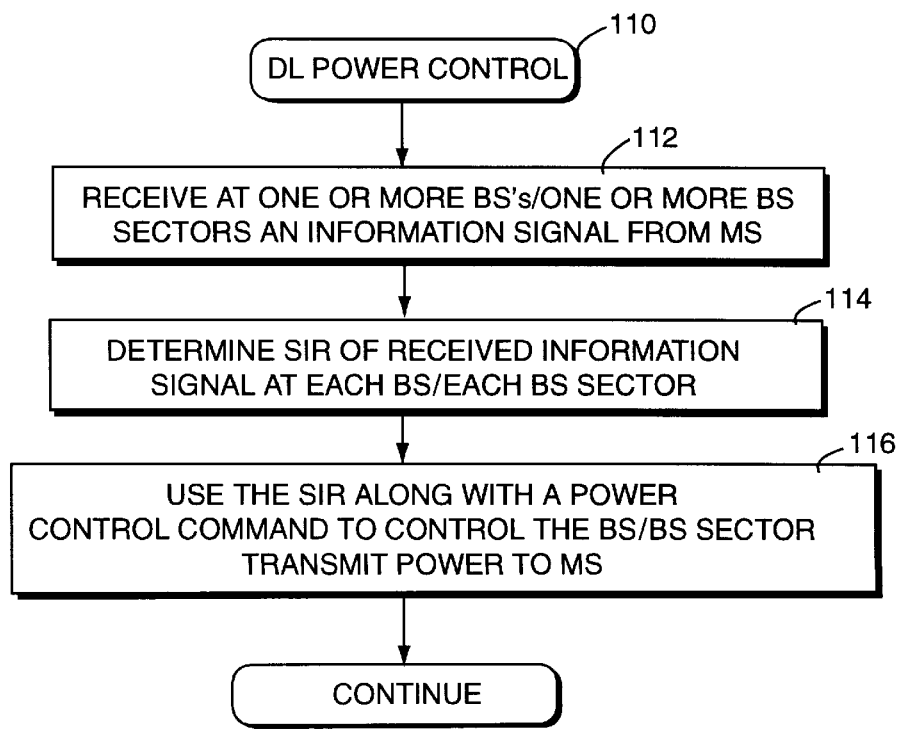
FIG. 5 is a function block diagram showing in more detail a preferred example embodiment of the present invention.

General downlink, base station, power control procedures in accordance with the present invention are now described in conjunction with a DownLink (DL) power control routine (block 100) illustrated in flowchart format in FIG. 5. The general downlink power control routine may be applied to one or more base stations as well as one or more base station sectors. One or more base stations/one or more sectors receives an information signal from the mobile station (block 112). Again, the signal-to-interference ratio (SIR) or other type of signal quality measurement parameter, e.g., bit error rate (BER), carrier-to-interference ratio (CIR), etc. is determined at each base station/each sector (block 114). Using the determined SIR along with a power control command, e.g., a TPC bit received from the mobile station, the corresponding base station/sector transmit power to the mobile station is adjusted appropriately (block 116).

Preferably, although not necessarily, the SIR value is scaled or processed in some fashion in the SIR processor 104. An example scaling embodiment of the present invention is described now in conjunction with FIG. 6 which shows relevant function blocks in the base station. However, those skilled in the art will appreciate that the present invention may be implemented in a number of different fashions including a suitably programmed microprocessor, digital signal processor (DSP), ASIC discrete circuits, etc.

A modulator 120 is connected to an amplifier 122, and the transmit power level from the base station to the mobile station is controlled by a control signal CS to amplifier 122. Data to be transmitted TX_DATA) are modulated and spread in the modulator 120, amplified in the amplifier 122, and transmitted over an antenna. Signals received from the mobile station are provided via the antenna to a demodulator 134 which demodulates and de-spreads the received signals. The demodulator 134 also determines signal energy $E_b$ and interference $I_o$ estimates and provides them to SIR unit 102. Received transmit power control bits are also interpreted in the demodulator 134 and accumulated in an integrator 106. The SIR unit 108 provides a corresponding signal-to-interference ratio (SIR) to an averaging unit or a delay unit 132. Averaging increases stability of the open loop and moderates the control update rate of the open loop. A delay slows down the control loop update rate. Regulation of the loop update rate is important because the open loop power control should be fast enough to follow the change in gain between the mobile station and the base station but also slow enough so that the open loop does not cancel the closed transmit power control loop.

The output of the averager or delay unit 132 is provided to a non-linear operation block 130. An example of a non-linear function NL(SIR) is a subtract and threshold operation as follows:

$$NL(SIR)=[SIR_{target}-SIR_{measured}], \text{for}[SIR_{target}-SIR_{measured}]<0,[dB]$$

$$NL(SIR)=0, \text{for}[SIR_{target}-SIR_{measured}]\geq 0,[dB].$$

This kind of non-linear operation ensures that the only effect of the open loop control is to lower the transmit power of those base stations that do not have the dominant connection to the mobile station. In other words, absent such a threshold operation, a high SIR value ($SIR_{target}$) would automatically lead to an increase in base station output power which in some situations is undesirable since this leads to increased interference.

The non-linear output is provided either directly to summer 124 or preferably to a scaling multiplier 128 which receives as another input a function value $f(x)$. The function $f(x)$ controls the slope or rate of the transmit power change as the mobile station travels between base stations/sectors involved in the handover. An example of such rate control is illustrated in FIG. 7. Assuming that the mobile station is moving from dominant base station 1/sector 1 toward less dominant base station 2/sector 2, the present invention decreases the transmit power from base station 1/sector 1 to the mobile station as it becomes less dominant in the handover region. At the same time, the present invention increases the transmit power from base station 2/sector 2 as the mobile station moves closer to base station 2/sector 2. By varying the value of $f(x)$, the slope or rate at which the transmit power from the old dominant base station 1/sector 1 decreases and the rate at which the transmit power from the new dominant base station 2/sector 2 increases are selectively controlled. Returning to the example embodiment of the invention shown in FIG. 6, the integrated TPC value is summed with the scaled SIR value in summer 124. The control signal (CS) generated by summer 124 controls the output power of amplifier 122, and therefore, the downlink transmit power level of the base station to the mobile station.

Figure 7:
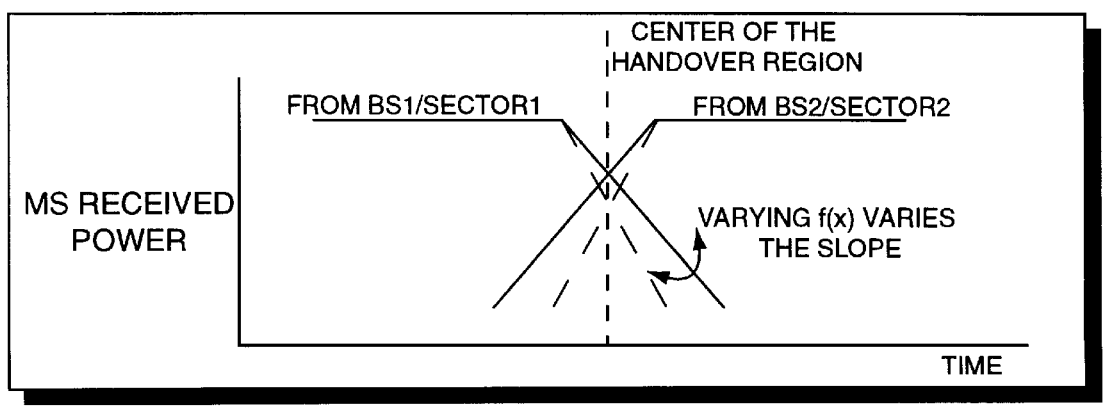
FIG. 7 is a flowchart diagram illustrating preferred particular SIR processing operations.
Figure 8:
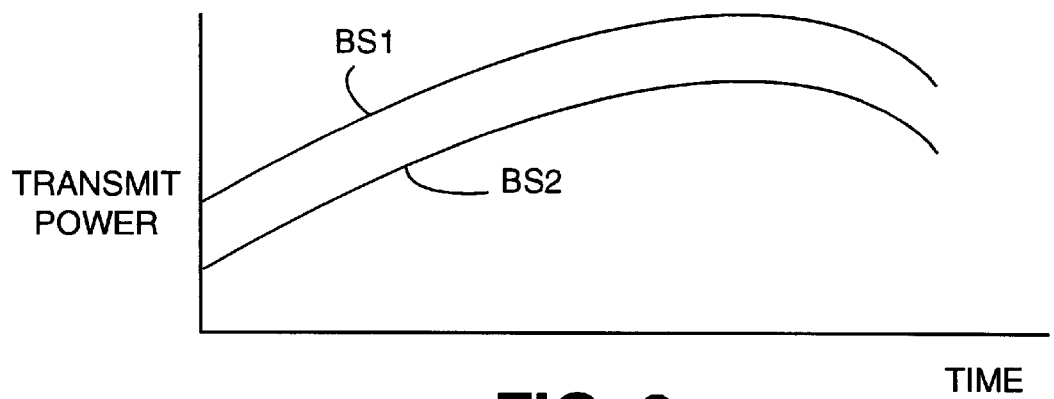
FIG. 8 is a graph showing base station transmit power in a soft handover situation where downlink power control is employed without the present invention.

The advantageous base station transmit power control profiles shown in FIG. 7 achieved using the present invention contrast with the graph in FIG. 8 showing base station power levels in a conventional soft handover situation. The transmit powers from both of the base stations BS1 and BS2 increase and are maintained at a high value throughout the duration of the handover operation. Such high transmit powers at both base stations are not only unnecessary but also detrimentally increase the overall interference level in the cell or sector.

Figure 6:
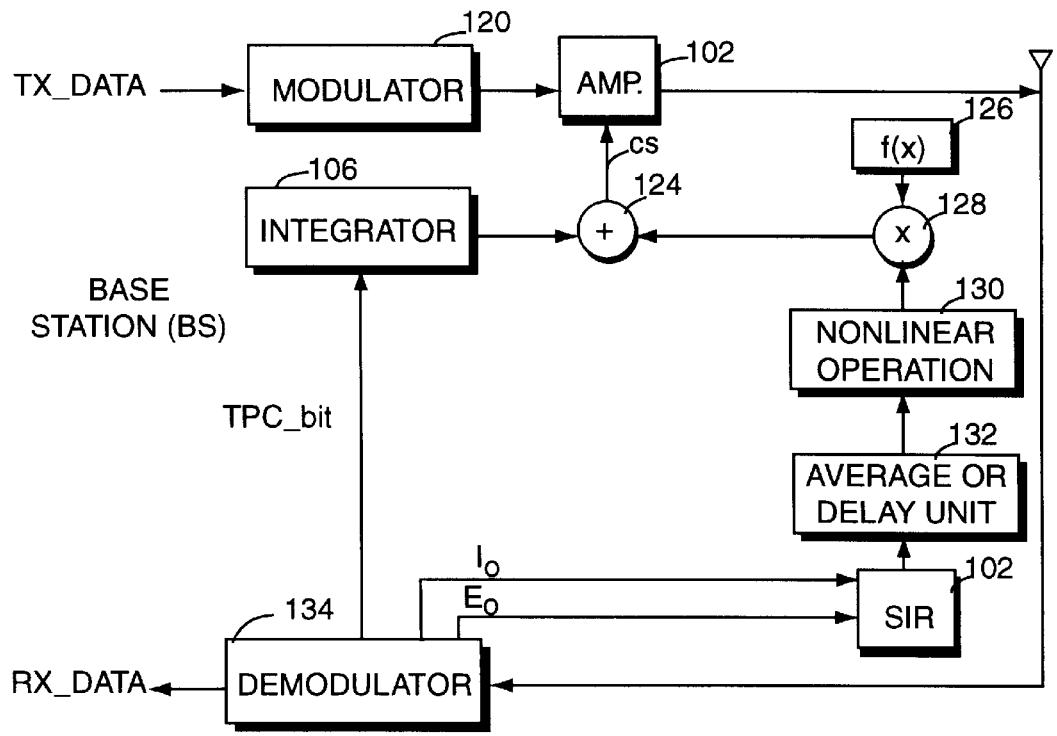
FIG. 6 is a flowchart illustrating a downlink power control routine in accordance with a general embodiment of the present invention.
Figure 9:
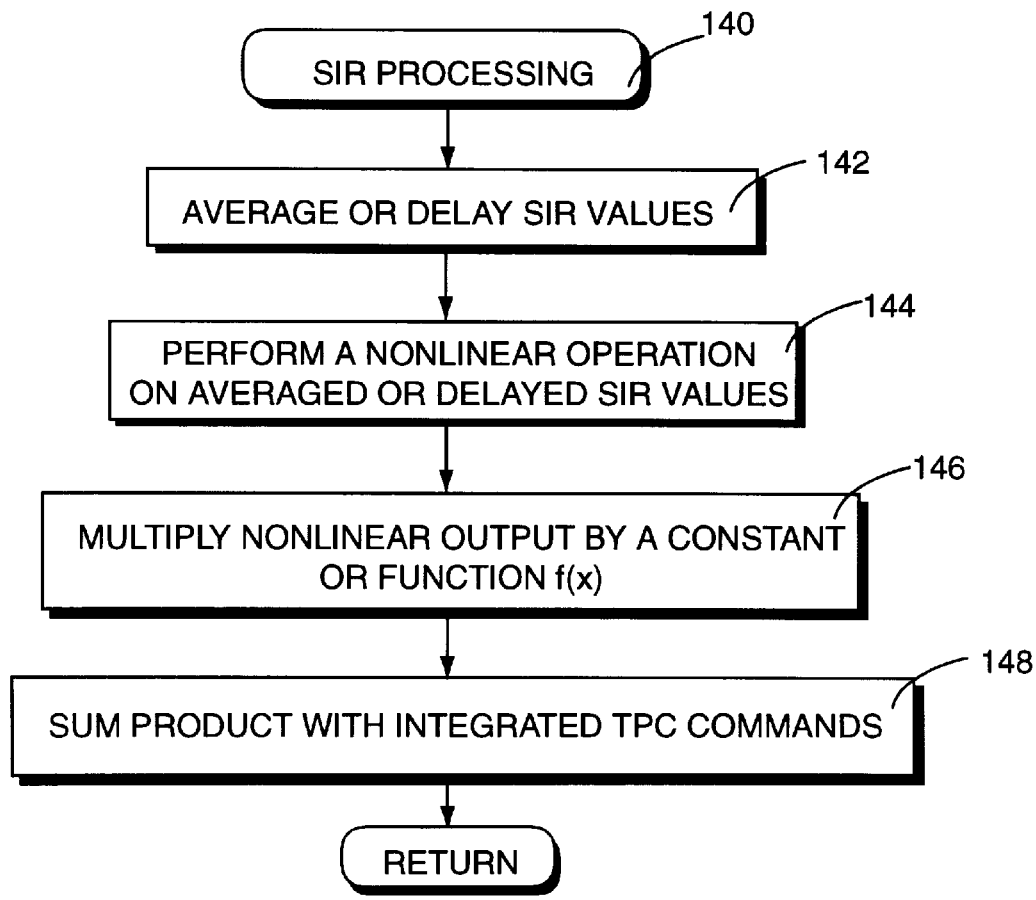
FIG. 9 is a graph illustrating mobile station received power from two base stations involved in a soft handover.

The SIR processing procedures employed in the example SIR scaling embodiment shown in FIG. 6 are now outlined in flowchart form in FIG. 9. The first step in the example SIR Processing routine (block 140) is to average or delay detected SIR values received from the SIR unit 102 (block 142). A non-linear operation (such as that described above) is performed on the averaged or delayed SIR values (block 144). The non-linear output is multiplied by a constant or other scaling function $f(x)$ (block 146). The scaled SIR output is then summed with the integrated TPC commands (block 148). The sum is used to control the power level at which data is transmitted from the base station to the mobile.

Figure 10:
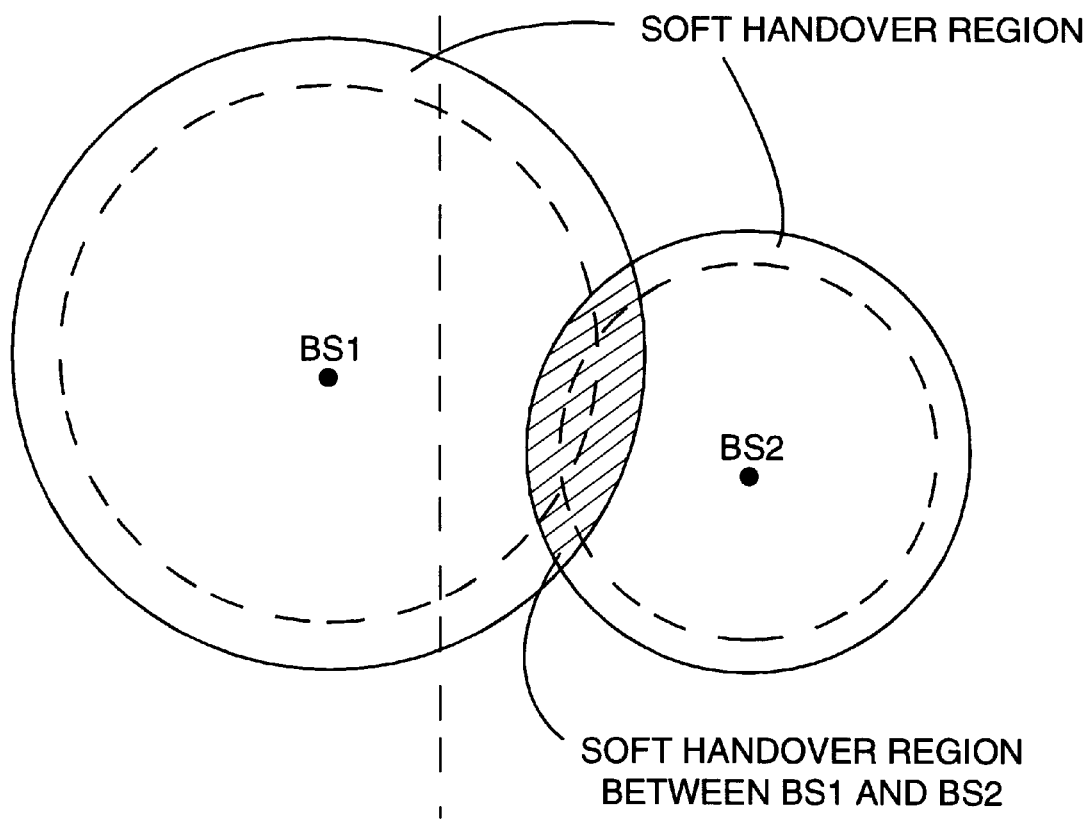
FIG. 10 is a diagram illustrating adjacent macro and micro cells in which the present invention may be advantageously employed.

As described above, the present invention can be used to advantage in soft handover situations between two base stations and in softer handover situations between two base station sectors. The invention also finds beneficial application to adjacent base station cells which have substantially different size. Reference is now made to FIG. 10 which shows a larger macro cell serviced by base station BS1 adjacent a smaller micro cell serviced by base station BS2. Both the macro and micro cells have a soft handover region at a peripheral region of their respective cells indicated by dashed lines. Moreover, the micro and macro cells overlap as indicated at the shaded portion corresponding to a soft handover region between the two base stations. If the open loop downlink power control were based upon received power from the mobile station, the dashed line represents the location where the path loss between the mobile station and the macro cell base station BS1 is the same as the path loss between the mobile station and the micro cell base station BS2. Consequently, within the soft handover region, the mobile station would receive power solely from the micro cell base station BS2. If the mobile station moves out of the soft handover region from the micro cell to the macro cell, the result would probably be a dropped call because the mobile station does not receive signals with sufficient power from the macro base station BS1. However, by using signal-to-interference ratio as the open loop power control parameter rather than received power level, the shift from the old dominant base station BS2 to the new dominant base station BS1 occurs as desired within the soft handover region.

Figure 11:
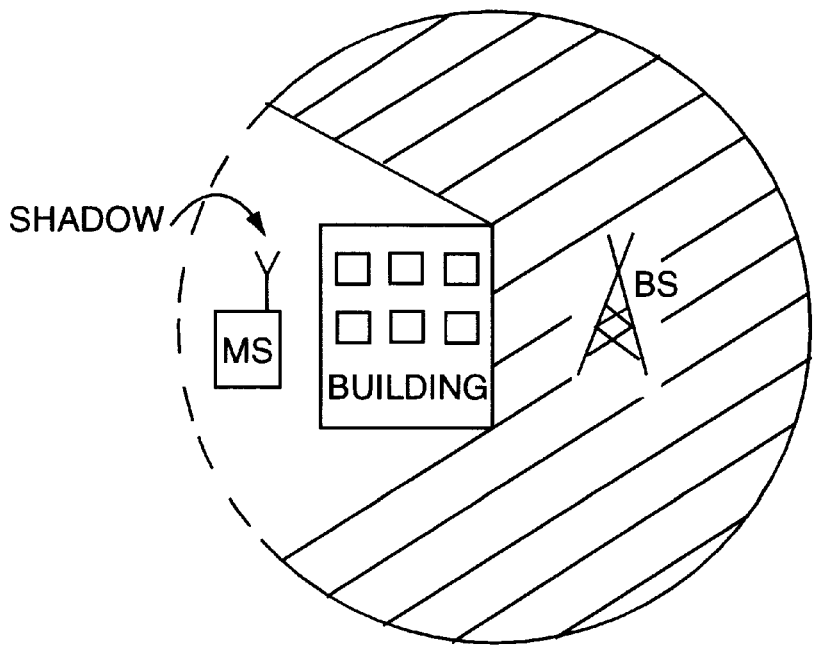
FIG. 11 is a diagram showing a shadowing situation in which the present invention may be advantageously employed.

The present invention also is useful in applications where a mobile station suddenly is "shadowed." Reference is made to FIG. 11 which shows a mobile station which is within the circumference of a first base station cell and at the same time is in soft handover to a second base station (not shown). The mobile moves to a "shadowed" region where a building blocks any direct line path between the first base station and the mobile station resulting in a poor connection. When the mobile station enters the shadowed area, the signal-to-noise interference ratio of signals received from the mobile station at the first base station decrease substantially. The first base station then treats that mobile station as effectively being handed over to the second base station. As a result, the open loop power control of the present invention will cause the first base station transmit power to that mobile station to decrease (because it is not the best base station to be transmitting to that mobile station), thereby advantageously decreasing the overall interference in that cell.

While the present invention has been described with respect to a particular embodiment, those skilled in the art will recognize that the present invention is not limited to the specific embodiments described and illustrated herein. Different formats, embodiments, and adaptations besides those shown and described as well as many modifications, variations, and equivalent arrangements may also be used to implement the invention. Therefore, while the present invention has been described in relation to its preferred embodiments, it is to be understood that this disclosure is only illustrative and exemplary of the present invention and is merely for the purposes of providing a full and enabling disclosure of the invention. Accordingly, it is intended that the invention be limited only by the spirit and scope of the claims appended hereto.

What is claimed is:

1. A method for controlling the transmit power of a base station transmission to a mobile station in a mobile communications system, comprising the steps of:

receiving a signal from the mobile station;

determining a signal to interference ratio (SIR) associated with the received signal;

modifying the SIR; and controlling the base station transmit power using a transmit power control command from the mobile station and the modified SIR.

2. The method in claim 1, further comprising:

combining the SIR with the transmit power control command to generate a transmit power control signal.

3. The method in claim 1, wherein the SIR modifying includes:

averaging the determined SIR.

4. The method in claim 1, wherein the SIR processing includes:

delaying the determined SIR.

5. The method in claim 1, wherein the mobile station is in the process of a soft handover operation involving first and second base stations.

6. The method in claim 1, wherein the mobile station is in the process of a softer handover operation involving first and second sectors in the base station.

7. The method in claim 1, wherein the SIR modifying includes filtering the determined SIR.

8. The method in claim 1, wherein the SIR modifying includes performing a nonlinear operation on the determined SIR.

9. The method in claim 1, wherein the SIR modifying includes multiplying the determined SIR by a function.

10. The method in claim 1, wherein the SIR is modified as follows:
averaging or delaying the SIR;
performing a non-linear operation on the averaged or delayed SIR to generate a non-linear SIR; and
multiplying the non-linear SIR by a function.

11. A method for controlling the transmit power of a base station transmission to a mobile station in a mobile communications system, comprising the steps of:
receiving a signal from the mobile station;
determining a signal to interference ratio (SIR) associated with the received signal;
accumulating plural transmit power control commands from the mobile station;
combining the SIR with an accumulated sum of transmit power control commands from the mobile station to generate a transmit power control signal; and
controlling the base station transmit power using the combined SIR and the accumulated sum of the transmit power control commands.

12. A method for controlling the transmit power of a base station transmission to a mobile station in a mobile communications system, comprising the steps of:
receiving a signal from the mobile station;
determining a signal to interference ratio (SIR) associated with the received signal;
performing a nonlinear operation on the determined SIR; and
controlling the base station transmit power using a transmit power control command from the mobile station and a result of the nonlinear operation performed on the determined SIR.

13. A method for controlling the transmit power of a base station transmission to a mobile station in a mobile communications system, comprising the steps of:
receiving a signal from the mobile station;
determining a signal to interference ratio (SIR) associated with the received signal;
multiplying the SIR by a function; and
controlling the base station transmit power using a transmit power control command from the mobile station and a result of the SIR multiplied by the function.

14. A base station for communicating with a mobile station comprising:
a receiver receiving a signal from the mobile station;
a signal to interference ratio (SIR) detector determining the SIR of the received signal;
a transmitter for transmitting an information signal to the mobile station; and
processing circuitry controlling the base station transmitter power using a transmit power control command from the mobile station and the SIR including:
an SIR processor that scales the SIR, and
a combiner combining the scaled SIR and the transmit power control command to generate a control signal used to control the base station transmitter power level.

15. The base station in claim 14, further comprising:
an integrator integrating transmit power control commands from the mobile station,
wherein an output of the integrator is combined in the combiner with the scaled SIR.

16. The base station in claim 14, wherein the SIR processor includes:
an averager averaging the SIR, and
a processor processing the averaged SIR to provide the scaled SIR.

17. The base station in claim 16, wherein the processor performs a nonlinear function that controls the rate at which the transmitter power level increases or decreases.

18. The base station in claim 14, wherein the SIR processor modifies the SIR as follows:
averaging or delaying the SIR;
performing a non-linear operation on the averaged or delayed SIR to generate a non-linear SIR; and
multiplying the non-linear SIR by a function.

19. A method for controlling the transmit power from two or more base stations to a mobile station in a mobile communications system where the mobile station is in a process of soft handover involving the two or more base stations, comprising the steps of:
receiving at the two or more base stations from the mobile station a power control command;
determining at the two or more base stations an SIR associated with a signal received from the mobile station; and
each of the base stations controlling its respective power using both the power control command and the SIR determined at that base station,
wherein when the mobile station is initially closer to a first base station and the transmit power of the first base station exceeds that of a second base station, and wherein as the mobile station moves into a soft handover region between the first and second base stations, the second base station power increases its transmit power to the mobile station, and the first base station decreases its transmit power to the mobile station, the first base station controlling the rate at which it decreases its transmit power based on the SIR determined at the first base station, and the second base station controlling the rate at which it increases its transmit power based on the SIR determined at the second base station.

20. The method in clam 19, further comprising:
combining the SIR with the transmit power control command to generate a transmit power control signal.

21. The method in claim 19, further comprising:
averaging the determined SIR.

22. The method in claim 19, further comprising:
delaying the determined SIR.

23. The method in claim 19, further comprising:
performing a nonlinear operation on the determined SIR.

24. The method in claim 19, further comprising:
multiplying the SIR by a function.

25. The method in claim 19, wherein the SIR determined at each bases station is modified as follows:
averaging or delaying the associated SIR;
performing a non-linear operation on the averaged or delayed SIR to generate a non-linear SIR; and
multiplying the non-linear SIR by a function.

26. A method for controlling the transmit power from two or more base stations to a mobile station in a mobile communications system where the mobile station is in a process of soft handover involving the two or more base stations, comprising the steps of:

receiving at the two or more base stations from the mobile station a power control command;

determining at each of the two or more base stations an SIR associated with a signal received from the mobile station;

each base station accumulating plural transmit power control commands from the mobile station and combining the SIR with an accumulated sum of the transmit power control commands to generate a transmit power control signal; and each base station controlling its respective power using both the power control command and the combined SIR determined at that base station.

27. A method for controlling the transmit power from two or more sectors of a base station to a mobile station in a mobile communications system where the mobile station is in a process of softer handover involving the two or more sectors of the base station, comprising the steps of:

receiving at the two or more sectors from the mobile station a power control command;

determining for the two or more sectors a SIR associated with a signal received from the mobile station; and controlling the respective power of each base station sector using both the power control command and the corresponding SIR determined for each of the two or more sectors.

28. The method in claim 27, wherein the mobile station is initially closer to a first sector and the transmit power of the first sector exceeds that of a second sector and as the mobile station moves into a softer handover region between the first and second sectors, the second sector transmit power increases to the mobile station and the first sector transmit power decreases to the mobile station.

29. The method in claim 28, further comprising:

controlling the rate at which the first sector's power is decreased, and controlling the rate at which the second sector's power is increased.

30. The method in claim 27, wherein each sector modifies its associated SIR and controls its respective power using both the power control command and its modified SIR.

31. The method in claim 30, wherein the SIR is modified by filtering.

32. The method in claim 30, wherein the SIR is modified by averaging.

33. The method in claim 30, wherein the SIR is modified by a delay.

34. The method in claim 30, wherein the SIR is modified by a non-linear function.

35. The method in claim 30, wherein the SIR is modified by multiplication with a function.

36. The method in claim 30, wherein the SIR is modified as follows:

averaging or delaying the associated SIR;

performing a non-linear operation on the averaged or delayed SIR to generate a non-linear SIR; and multiplying the non-linear SIR by a function.

* * * * *